Patented Oct. 23, 1951

2,572,809

UNITED STATES PATENT OFFICE 2,572,809

PRODUCTION OF AMIDES

Charles F. Jelinek, Easton, Pa., assignor to General Aniline & Film Corporation, New York, N. Y., a corporation of Delaware No Drawing. Application March 18, 1948,
Serial No. 15,739

13 Claims. (Cl. 260—247.1)

This invention relates to a process for the preparation of amides by a modification of the Willgerodt reaction, wherein an acetal is employed as a reactant in place of the ketones or other compounds heretofore employed.

The production of amides from ketones by oxidation of a ketone with aqueous ammonium polysulfide is well known in the art as the Willgerodt reaction, having first been described by Willgerodt in 1887. In accordance with this reaction, a ketone is heated with an aqueous solution of ammonium polysulfide to give an amide and the ammonium salt of the corresponding acid. This reaction has subsequently been shown to be effective in converting aldehydes to amides and it has also been found that in place of ammonium polysulfide, a mixture of ammonium hydroxide and sulfur may be employed or, if desired, a primary or secondary amine in admixture with sulfur may be employed as the reactant. In case an amine is employed in the reaction, it is customary to conduct the same in the absence of water and the reaction product, when employing an amine, is not the amide but the thioamide which, however, may be hydrolyzed in the same manner as the amide to give the corresponding acid.

I have now discovered that acetals, in spite of their known stability in alkaline media, may readily be converted into amides or thioamides by the mechanism of the Willgerodt reaction by merely substituting an acetal of the type hereinafter specified for the ketone or similar carbonyl compound which has heretofore been employed in the reaction.

The acetals which can be employed in practicing the present invention may be represented by the following general formula:

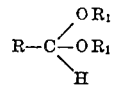

wherein R is hydrocarbon (i. e. alkyl, cycloalkyl, aryl or alkaryl) and $OR_1$ is residue of an alcohol. Since the alcohol is split off during the reaction, from a practical standpoint it is preferably that $R_1$ be lower alkoxy. However, the process is operative when employing acetals of higher alcohols. As specific examples of acetals of this type which may be employed in practicing the present invention may be mentioned acetaldehyde dimethyl acetal, propionaldehyde dimethyl acetal, butyraldehyde dimethyl acetal, isobutyraldehyde dimethyl acetal, valeraldehyde dimethyl acetal, heptaldehyde dimethyl acetal, lauraldehyde dimethyl acetal, stearaldehyde dimethyl acetal, benzaldehyde dimethyl acetal, phenylacetaldehyde dimethyl acetal, β-phenylpropionaldehyde dimethyl acetal and hexahydrobenzaldehyde dimethyl acetal, the corresponding diethyl acetals and acetals of lower alcohols such as dibutyl acetals of the aldehydes mentioned above or mixed acetals such as methyl ethyl acetal of acetaldehyde.

When ammonium polysulfide or a mixture of ammonium hydroxide and sulfur are employed as the oxidizing agents, the reaction is generally carried out in the form of an aqueous solution. On the other hand, as is common in Willgerodt's reaction, when a mixture of a primary or secondary amine and sulfur is employed, the reaction is preferably carried out under anhydrous conditions. Examples of amines which may be employed in practicing the present invention include primary and secondary alkyl, aryl and heterocyclic amines, including by way of example, methylamine, dimethylamine, ethylamine, diethylamine, dibutylamine, isopropylamine, morpholine, piperidine, 1- and 2-naphthylamine, aniline and methyl aniline.

The reaction proceeds readily on heating a mixture of the reactants. Temperatures from 125° C. to as high as 230° C. have been found operative and in general, temperatures ranging from 150° C. to 200° C. appear to be the most satisfactory. In the event that one or more of the reactants is volatile at the reaction temperature, the reaction is preferably carried out in a closed vessel under pressure, but may be carried out at atmospheric pressure if the particular reactants employed remain liquid or can be refluxed at atmospheric pressure. It has also been found beneficial, although not essential, to employ a mutual solvent for the reactants, such as dioxane, particularly when acetals of relatively high molecular weight are employed as one of the reactants.

The following specific examples illustrate specific embodiments of the present invention. The parts are by weight.

Example 1

A mixture of 2 parts of dimethyl butyral, 10 parts of dioxane and an ammonium polysulfide solution, prepared by passing hydrogen sulfide into 10 parts of concentrated ammonium hydroxide and 1 part of sulfur until the sulfur dissolved, was charged into a Carius tube. The tube was sealed and then heated for 12 hours at 160° C. After removal from the tube, the reaction mixture was evaporated to dryiness on a steam bath, and 20 parts of water were added to the residue. After filtration to remove the unreacted sulfur, the mixture was again evaporated to dryness and the butyramide recrystallized from benzene to give crude butyramide in 80% yield. Further recrystallization from benzene gave a produce melting at 115–116° C. Analysis: Calculated for $C_4H_9ON$: C, 55.14; H, 10.41. Found: C, 55.09; H, 10.55.

*Example 2*

Using the general procedure outlined in Example 1, except that 3 parts of dimethyl benzal was employed in place of the 2 parts of dimethyl butyral and the product was recrystallized from water, there was obtained a 75% yield of benzamide, M. P. 128–129° C.

*Example 3*

A mixture of 2 parts of dimethyl butyral, 10 parts of concentrated ammonium hydroxide, 6 parts of sulfur and 10 parts of dioxane was charged into a Carius tube. After sealing the reaction vessel, the mixture was heated at 160° C. for 12 hours. The reaction mixture was then removed from the tube and evaporated to dryness on a steam bath. Upon recrystallization of the reaction product from benzene, there was obtained a 64% yield of butyramide melting at 114–115° C.

*Example 4*

Using the general procedure outlined in Example 3, except that the dimethyl butyral was replaced with 3 parts of dimethyl benzal and the product was crystallized from water, there was obtained a 63% yield of benzamide, M. P. 125–127° C.

*Example 5*

A mixture of 76 parts of dimethyl benzal, 32 parts of sulfur and 87 parts of morpholine was heated while stirring at reflux temperature (125–140° C.) for 10 hours. During this heating, hydrogen sulfide was evolved. The moist solid, which formed on cooling the reaction mixture, was recrystallized from ethyl alcohol to obtain 50 parts of 4-thiobenzoylmorpholine melting at 134–138° C.

It will, of course, be understood that the foregoing examples are merely illustrative and are not to be regarded as limiting the invention thereby. Various modifications of this invention will be obvious to a worker in the art and such modifications are accordingly intended to be included within the purview of this application and the scope of the appended claims. The term "amide" in the appended claims is employed in its generic sense as including both the usual oxoamides and the thioamides in which the oxygen of the carbonyl group is replaced with sulfur.

I claim:

1. A process for preparing an amide of a carboxylic acid which comprises reacting by heating at a temperature of from about 125 to about 230° C., a mixture of an acetal of the formula:

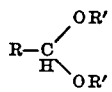

wherein R represents a member of the group consisting of alkyl, cycloalkyl and aryl radicals and R' represents an alkyl radical; sulfur and a basic nitrogen compound in which the nitrogen carries at least one hydrogen atom and which is selected from the group consisting of ammonia, primary and secondary lower alkyl amines, primary and N-lower alkyl aryl amines, morpholine and piperidine.

2. A process for preparing an amide of a carboxylic acid which comprises reacting by heating at a temperature of from about 125 to about 230° C., a mixture of an acetal of the formula:

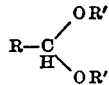

wherein R represents a member of the group consisting of alkyl, cycloalkyl and aryl radicals and R' represents an alkyl radical; sulfur and aqueous ammonia.

3. A process for preparing an amide of a carboxylic acid which comprises reacting by heating at a temperature of from about 125 to about 230° C., a mixture of an acetal of the formula:

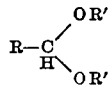

wherein R represents a member of the group consisting of alkyl, cycloalkyl and aryl radicals and R' represents an alkyl radical; sulfur and ammonia, the sulfur and ammonia being supplied by an aqueous ammonium polysulfide solution.

4. The process for preparing a thioamide of a carboxylic acid which comprises reacting by heating at a temperature of from about 125 to about 230° C., a mixture of an acetal of the formula:

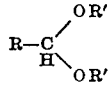

wherein R represents a member of the group consisting of alkyl, cycloalkyl and aryl radicals and R' represents an alkyl radical; sulfur and morpholine.

5. The process for producing fatty acid amides which comprises reacting by heating at a temperature of about 125 to about 230° C., a mixture of a dialkyl acetal of an alkanol, sulfur and aqueous ammonia.

6. The process for producing fatty acid amides which comprises reacting by heating at a temperature of about 125 to about 230° C., a mixture of a dialkyl acetal of an alkanol, sulfur and ammonia, the sulfur and ammonia being supplied by an aqueous ammonium polysulfide solution.

7. The process for prodcing butyramide which comprises reacting by heating dimethyl butyral with sulfur and aqueous ammonia at a temperature of about 160° C.

8. The process for producing butyramide which comprises reacting by heating dimethyl butyral with sulfur and ammonia at a temperature of about 160° C., the sulfur and ammonia being supplied by an aqueous ammonium polysulfide solution.

9. The process for producing benzamide which comprises reacting by heating at a temperature of about 125 to about 230° C., a dialkyl acetal of benzaldehyde with sulfur and aqueous ammonia.

10. The process for producing benzamide which comprises reacting by heating at a temperature of about 125 to about 230° C., a dialkyl acetal of benzaldehyde with sulfur and ammonia, the sulfur and ammonia being supplied by an aqueous ammonium polysulfide solution.

11. The process for producing benzamide which comprises reacting by heating dimethyl benzal with sulfur and aqueous ammonia at a temperature of about 160° C.

12. The process for producing benzamide which comprises reacting by heating dimethyl benzal with sulfur and ammonia at a temperature of about 160° C., the sulfur and ammonia being supplied by an aqueous ammonium polysulfide solution.

13. The process for producing 4-thiobenzoyl morpholine which comprises reacting by heating at a temperature of about 125 to about 140° C., dimethyl benzal with sulfur and morpholine.

CHARLES F. JELINEK.

REFERENCES CITED

The following references are of record in the file of this patent:

FOREIGN PATENTS

| Number | Country | Date |
| --- | --- | --- |
| 403,123 | Germany | Sept. 25, 1924 |
| 405,675 | Germany | Nov. 4, 1924 |
| 450,218 | Great Britain | July 9, 1936 |

OTHER REFERENCES

Willgerodt: "Ber. Deut. Chem.," vol. 21, p. 535 (1888).

Kindler: "Liebig's Annalen," vol. 431, pp. 224 and 226 (1923).

Karrer: "Organic Chemistry," p. 142 (1938).

Richter's "Organic Chemistry," vol. I, p. 242 (1944).

Cavalieri et al.: "J. Am. Chem. Soc.," vol. 67, p. 1785, October 1945.

Carmack et al.: "J. Am. Chem. Soc.," vol. 68, p. 2029, October 1946.